(12) United States Patent
Inuduka et al.

(10) Patent No.: US 8,416,049 B2
(45) Date of Patent: Apr. 9, 2013

(54) MULTILAYERED CERAMIC COMPONENT AND MANUFACTURING METHOD THEREOF

(75) Inventors: Tsutomu Inuduka, Osaka (JP); Hironori Motomitsu, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/121,656

(22) PCT Filed: Oct. 5, 2009

(86) PCT No.: PCT/JP2009/005140
§ 371 (c)(1),
(2), (4) Date: Mar. 29, 2011

(87) PCT Pub. No.: WO2010/044213
PCT Pub. Date: Apr. 22, 2010

(65) Prior Publication Data
US 2011/0181384 A1 Jul. 28, 2011

(30) Foreign Application Priority Data
Oct. 14, 2008 (JP) .................................. 2008-265050

(51) Int. Cl.
*H01F 5/00* (2006.01)
*H01F 27/02* (2006.01)
*H01F 27/28* (2006.01)

(52) U.S. Cl.
USPC ................ 336/200; 336/83; 336/96; 336/232

(58) Field of Classification Search .................... 336/83, 336/96, 200, 233
See application file for complete search history.

(56) References Cited

U.S. PATENT DOCUMENTS

| 6,008,151 A * | 12/1999 | Sasaki et al. ..................... 501/17 |
| 6,392,525 B1 * | 5/2002 | Kato et al. ....................... 336/233 |
| 2006/0158301 A1 | 7/2006 | Shinkai et al. |

FOREIGN PATENT DOCUMENTS

| JP | 09-132483 | 5/1997 |
| JP | 10-338545 | 12/1998 |
| JP | 11-171640 | 6/1999 |
| JP | 2004-161562 | 6/2004 |
| JP | 2005-340611 | 12/2005 |
| JP | 2007-258384 | 10/2007 |
| JP | 2008-074679 | 4/2008 |

\* cited by examiner

*Primary Examiner* — Mohamad Musleh
*Assistant Examiner* — Tsz Chan
(74) *Attorney, Agent, or Firm* — McDermott Will & Emery LLP

(57) ABSTRACT

A laminated ceramic component includes a ferrite magnetic layer and a glass ceramic layer made chiefly of borosilicate glass. The glass ceramic layer is laminated with the ferrite magnetic layer, and has an Ag inner conductor embedded inside. A microscopic region where aluminum and silver coexist is dispersed in the glass ceramic layer.

3 Claims, 2 Drawing Sheets

MULTILAYERED CERAMIC COMPONENT AND MANUFACTURING METHOD THEREOF

RELATED APPLICATIONS

This application is the U.S. National Phase under 35 U.S.C. §371 of International Application No, PCT/JP2009/005140, filed on Oct. 5, 2009, which in turn claims the benefit of Japanese Application No. 2008-265050, filed on Oct. 14, 2008, the disclosures of which applications are incorporated by reference herein.

TECHNICAL FIELD

The present invention relates to laminated ceramic components employed in a range of electronic devices, and more particularly to laminated ceramic components that can be sintered at low temperatures.

BACKGROUND ART

In response to the need for electronic devices to cope with an increasing volume of information at ever higher speeds, laminated ceramic components installed in electronic devices need to support higher frequencies. An effective way of achieving this is to reduce the stray capacitance of circuit patterns in laminated ceramic components. An insulating material used in laminated ceramic components thus needs to have a low dielectric constant.

In this type of laminated ceramic component, silver, which has high conductivity, is often used for the circuit patterns formed inside, to reduce electric resistance inside the circuit. Therefore, the insulating material with low dielectric constant needs to be sintered and densified at around 900° C., not higher than the melting point of silver.

Commonly-used insulating materials with low dielectric constant that satisfy the above requirements include a borosilicate material to which a filler such as silica, alumina, forsterite, or cordierite is added. Glass ceramic of borosilicate glass mixed with filler is often used for laminated ceramic components supporting high frequencies. In particular, crystalline silica is often used as the filler for adjusting the thermal expansion coefficient in the case of sintering simultaneously with ferrite, which is a magnetic material. This type of glass sintered at low temperature is disclosed, for example, in PTL 1.

However, silver is liable to spread across a wide area in borosilicate glass if conventional borosilicate glass is used as a low-dielectric material for a glass ceramic layer. Silver thus migrates in the laminated ceramic component. This leads to defects, including short-circuiting, that cause reduced reliability.

In particular, spreading of silver is accelerated if the glass ceramic layer and a ferrite magnetic layer are sintered simultaneously. This significantly reduces the reliability of the laminated ceramic component.
[Citation List]
[Patent Literature]
[PTL 1] Japanese Patent Unexamined Publication No. H11-171640

SUMMARY OF THE INVENTION

The present invention offers a highly-reliable laminated ceramic component that suppresses migration of silver. The laminated ceramic component of the present invention includes a ferrite magnetic layer and a glass ceramic layer made chiefly of borosilicate glass. The glass ceramic layer is laminated with the ferrite magnetic layer and has a silver inner conductor embedded inside. A microscopic region where aluminum and silver coexist is dispersed in the glass ceramic layer. This laminated ceramic component is manufactured in the following way. First, a glass ceramic green sheet is made by mixing borosilicate glass powder, crystalline silica, and hydrated alumina powder. The mixing ratio of hydrated alumina is not less than 0.5 weight percent and not greater than 4.5 weight percent in the glass ceramic green sheet. Next, the silver inner conductor is formed in this glass ceramic green sheet. A ferrite green sheet and the glass ceramic green sheet are then laminated to form a laminated body. This laminated body is sintered at a temperature not higher than the melting point of silver.

With this structure, silver does not spread across a wide area in the glass ceramic layer, and is fixed, together with aluminum, in a microscopically small dispersion region of hydrated alumina mixed into the borosilicate glass. The migration of silver is thus suppressed in an electric field and even if $H_2O$ is present.

DETAILED DESCRIPTION OF PREFERRED EMBODIMENTS

Figure 1:
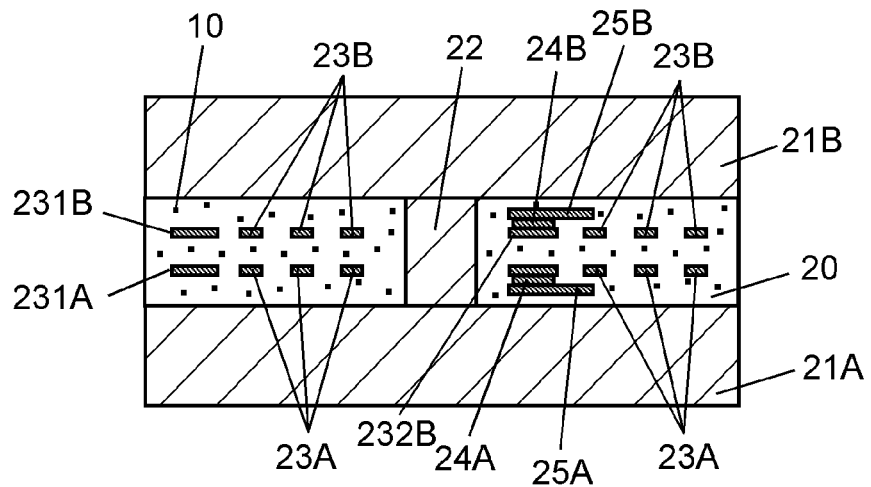
FIG. 1 is an internal sectional view of a laminated ceramic component in accordance with a preferred embodiment of the present invention.
Figure 2:
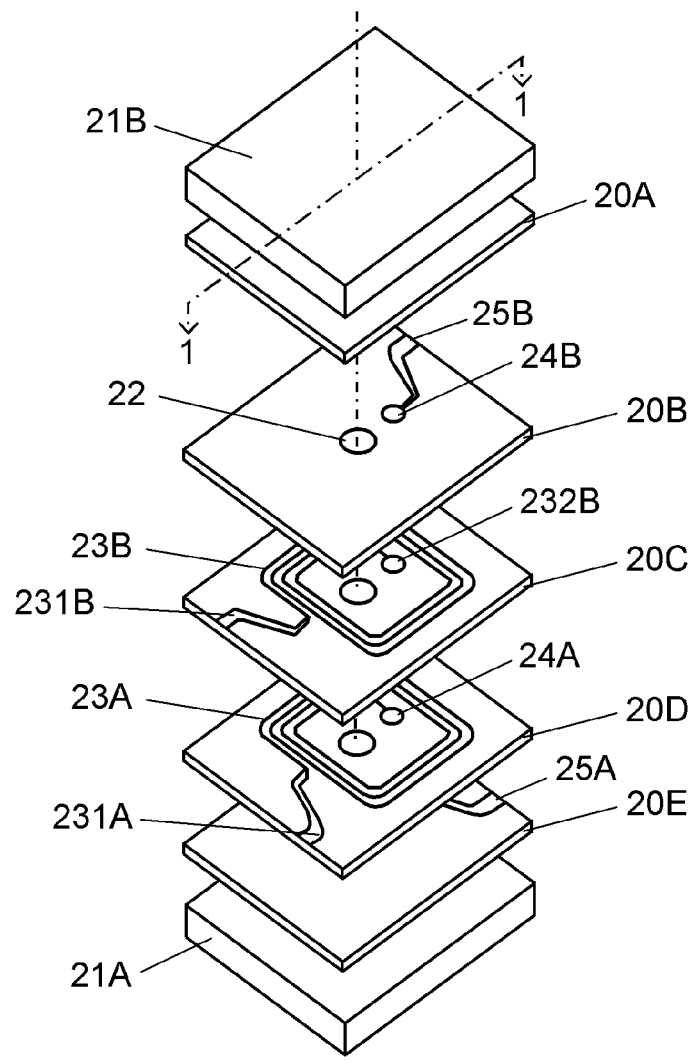
FIG. 2 is an exploded perspective view of the laminated ceramic component shown in FIG. 1.
Figure 3:
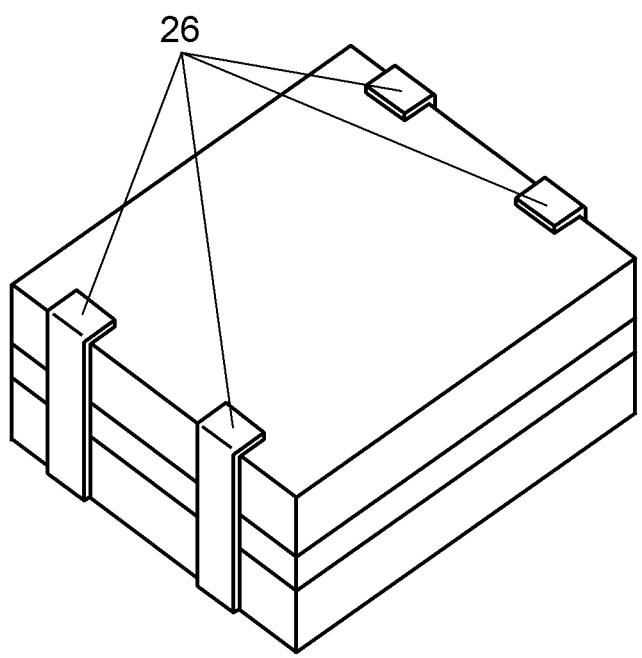
FIG. 3 is an external view of the laminated ceramic component shown in FIG. 1.

A laminated ceramic component of the present invention is described below using an example of a common-mode noise filter that is obtained by sintering simultaneously a ferrite green sheet and a glass ceramic green sheet. FIG. 1 is a sectional view of the laminated ceramic component, FIG. 2 is an exploded perspective view of this laminated ceramic component, and FIG. 3 is an external view of this laminated ceramic component. FIG. 1 is the sectional view taken along line 1-1 in FIG. 2.

As shown in FIG. 1, the laminated ceramic component includes glass ceramic layer 20 made chiefly of borosilicate glass, ferrite magnetic layers 21A and 21B, ferrite via 22, and silver (Ag) flat coils 23A and 23B. Microscopic region 10 where aluminum (Al) and Ag coexist is dispersed in glass ceramic layer 20. Ferrite magnetic layers 21A and 21B sandwich glass ceramic layer 20.

As shown in FIGS. 1 and 2, flat coil 23A is formed on layer 20D, and lead wire 25A is formed on layer 20E. One end of flat coil 23A is electrically coupled to one of external end electrodes 26 shown in FIG. 3 through Ag via electrode 24A and lead wire 25A. Flat coil 23B is formed on layer 20C, and lead wire 25B is formed on layer 20B. One end 232B of flat coil 23B is electrically coupled to one of other external end electrodes 26 through Ag via electrode 24B and lead wire 25B. Other ends 231A and 231B of flat coils 23A and 23B are electrically coupled to remaining two external end electrodes 26. Layers 20A to 20E form glass ceramic layer 20.

Next is described an example of manufacturing process of the laminated ceramic component as configured above. First, ceramic slurry is made by mixing a mixed powder of borosilicate glass powder, crystalline silica powder, and $Al(OH)_3$ powder, which are primary materials of glass ceramic layer 20, with a binder and a solvent. The mixed powder is composed of, for example, 68.5 weight percent of borosilicate glass powder, 29 weight percent of crystalline silica powder, and 2.5 weight percent of $Al(OH)_3$. The binder is typically acrylic resin, and the solvent is typically toluene, ethyl acetate, or butyl acetate. Prepared ceramic slurry is formed into a sheet typically about 25 μm thick, using the doctor blade method, so as to form a glass ceramic green sheet to be used for glass ceramic layer 20.

In the same way, ceramic slurry is made, using a ball mill, by mixing a Ni—Zn—Cu ferrite powder that can be sintered at 900° C. or below, a binder, and a solvent. The binder is typically butyral resin and phthalic acid plasticizer, and the solvent is typically butyl acetate or buthanol. Prepared ceramic slurry is formed into a sheet typically about 50 to 100 μm thick, using the doctor blade method, so as to form a ferrite green sheet to be used for ferrite magnetic layers 21A and 21B.

Next, Ag paste is used for forming via electrodes, which become Ag via electrodes 24A and 24B, on layers 20B and 20D. These via electrodes electrically couple layers. Then, Ag flat coil conductors, which will become flat coils 23A and 23B, are formed on layers 20C and 20D by printing or transfer method. Conductor parts, which will become lead wires 25A and 25B, are formed on layers 20B and 20E, using Ag paste. Then, two ferrite green sheets and each glass ceramic green sheet are laminated sequentially in a structure shown in FIG. 2 to manufacture a laminated body. Ferrite via 22 is formed by creating a hole near an axis of the flat coil and filling the ferrite paste into this hole.

Next, this laminated body is sintered at 900° C. to manufacture a sintered laminated body with a lamination structure that two flat coils 23A and 23B are embedded in glass ceramic layer 20. Ag paste is applied to end faces of lead wires 25A and 25B and ends 231A and 231B that are exposed to outer side faces of this sintered laminated body, so as to electrically couple and form an Ag metallized layer. Then, Ni and Sn are plated to form external end electrodes 26.

The binder used for the glass ceramic green sheet and ferrite green sheet may be butyral resin or acrylic binder whose lamination character is controlled by using an appropriate amount of plasticizer. In other words, an ordinary binder is applicable without any limitation.

The solvent may be ester, ketone, or alcohol solvent. As required, high-boiling solvent may be used for controlling drying speed. Ester solvent is typically ethyl acetate or butyle acetate. Ketone solvent is typically toluene or methyl ethyl ketone (MEK). Alcohol solvent is typically isopropyl alcohol (IPA) or buthanol. The solvent is thus not particularly limited.

General mixing methods, such as a medium agitation mill, may be used in addition to ball mill. The mixing method is thus not particularly limited. General sheet forming, such as pressurized sheet forming, may be used in addition to the doctor blade method. The forming method is thus not particularly limited.

In this preferred embodiment, Ag in Ag via electrodes 24A and 24B, and flat coils 23A and 23B does not spread across a wide area in glass ceramic layer 20 during sintering. In addition, Ag is fixed together with Al in a microscopic dispersion region of hydrated alumina ($Al(OH)_3$ powder) mixed into borosilicate glass. As a result, glass ceramic layer 20 in the laminated ceramic component has a structure in which microscopic region 10 where Al and Ag coexist is dispersed. Accordingly, Ag migration can be suppressed in an electric field and even if $H_2O$ is present.

The laminated ceramic component is manufactured as described above (Sample A), and results of confirming its effect is described next. For comparison, a laminated ceramic component using a glass ceramic green sheet without adding $Al(OH)_3$ powder is manufactured (Sample B) and evaluated. A laminated ceramic component using a glass ceramic green sheet to which $Al_2O_3$ powder is added, instead of $Al(OH)_3$ powder, for equal amount is also manufactured (Sample C) and evaluated. Furthermore, a laminated ceramic component with built-in flat coil is manufactured using only the glass ceramic green sheet of Sample B without the ferrite green sheet (Sample D) and evaluated. This is to compare with a case when glass ceramic sheet is not sintered simultaneously with ferrite. These samples are manufactured using the same process, except for materials used.

First, an energy dispersive elemental mapping analysis is applied to cross sections of Sample A, Sample B, Sample C, and Sample D. As a result, in Sample A, microscopic region 10 of not greater than 5 μm in which Al and Ag coexist is dispersed in a matrix of glass ceramic layer 20 where Ag cannot be detected. On the other hand, in Sample B, Ag spreads across a wide area in the glass ceramic layer, and Ag is strongly detected in some of microscopic regions. In sample C, microscopic region in which only Al is detected and microscopic region in which Ag is strongly detected are observed, and Ag spreads across a wide area in the glass ceramic layer. In Sample D, Ag is scarcely detected in the glass ceramic layer. This indicates that spreading of Ag is accelerated by sintering simultaneously with ferrite. Accordingly, only when hydrated alumina is added to glass ceramic layer 20, Ag, whose spreading is accelerated by sintering simultaneously with ferrite, is firmly fixed to Al at sintering simultaneously with ferrite.

Table 1 shows a defect rate as a result of a reliability test applying the pressure cooker bias test (PCBT test) to 100 laminated ceramic components of each sample. In the PCBT test, laminated ceramic components are left for 48 hours under ambient conditions of 2 atmospheres, 85% humidity, and 125° C. temperature, while 5-V voltage is applied between flat coils 23A and 23B. In the results, those with insulation resistance reduced to $1 \times 10^6 \Omega$ or below are evaluated as defect.

TABLE 1

| Sample | Additive | Ferrite magnetic layer | Defect rate (%) |
|---|---|---|---|
| A | $Al(OH)_3$ | Yes | 0 |
| B | None | Yes | 62 |
| C | $Al_2O_3$ | Yes | 54 |
| D | None | No | 0 |

In case of Sample D, which is not sintered simultaneously with ferrite, almost no defects occur in the PCBT test because Ag scarcely spreads in the glass ceramic layer. In Sample B and Sample C, which are sintered simultaneously with ferrite, defects occur in the PCBT test because Ag spreads across a wide area in the glass ceramic layer. In contrast, $Al(OH)_3$, which is hydrated alumina, is added to glass ceramic layer 20 in Sample A. This enables firm fixing of Ag to Al in glass ceramic layer 20, and therefore no defects occur in the PCBT test. Accordingly, a highly-reliable laminated ceramic component can be manufactured in this preferred embodiment.

The borosilicate glass is a glass in which boron (B) is added to $SiO_2$ skeleton. This glass softens and melts at 900° C. or below. A small amount of alkali such as Al and K, or alkali earths such as Ca may also be added. Composition of B in the borosilicate glass is preferably not less than 15 weight percent and not greater than 28 weight percent in oxide equivalent. If the composition of B in the borosilicate glass is less than 15 weight percent in oxide equivalent, a glass melting point rises, and a fully-densified sintered body cannot be achieved. In addition, if the composition of B in the borosilicate glass exceeds 28 weight percent in oxide equivalent, it becomes difficult to reliably manufacture glass powder.

Content of crystalline silica powder is not less than 20 weight percent and not greater than 40 weight percent. If the content is less than 20 weight percent, a thermal expansion coefficient differs too much from that of ferrite. This will increase the possibility of causing a crack in the glass ceramic layer during simultaneous sintering. If the content exceeds 40 weight percent, glass ceramic layer 20 is not sufficiently sintered. Fully-densified glass ceramic layer 20 cannot be achieved. If the crystalline silica powder of 20 weight percent is added, the thermal expansion coefficient of glass ceramic is $54 \times 10^{-7}/°C$. If the thermal expansion coefficient exceeds this value, no crack is generated on glass ceramic layer 20, and thus it can be sintered simultaneously with ferrite.

If AlOOH, which is hydrated alumina, is used instead of $Al(OH)_3$, and Sample E is manufactured through the same process as Sample A, a defect rate is also zero in the PCBT test. Accordingly, a highly-reliable laminated ceramic component can be manufactured also when AlOOH is used. Also when both AlOOH and $Al(OH)_3$ are used, a defect rate is zero. Accordingly, hydrated alumina powder of at least AlOOH or $Al(OH)_3$ is added to the glass ceramic green sheet. However, $Al(OH)_3$ is more preferable with respect to its good productivity.

A high temperature of 1000° C. or above is needed to alter added hydrated alumina to alumina $(Al_2O_3)$. However, in the preferred embodiment, the glass ceramic layer is preferably sintered at not higher than the melting point of Ag, preferably around 900° C., in order to sinter simultaneously with Ag. Accordingly, hydrated alumina in sintered glass ceramic layer 20 is not altered to alumina. Also in analysis using X-ray diffraction, alumina is not detected. Addition of hydrated alumina in this preferred embodiment thus has totally different effect from addition of alumina generally used as a filler of glass material.

Next, results of examination on a mixing quantity of hydrated alumina is described. Ratios of borosilicate glass and crystalline silica mixed in a green sheet that forms glass ceramic layer 20 are fixed to 70:30, based on ratio by weight, and $Al(OH)_3$ is mixed ranging from 0.1 weight percent to 5 weight percent. Under these conditions, mixed powder of 100 weight percent in total is used for manufacturing laminated ceramic components through the same process as Sample A (Sample F to Sample R). Then, the PCBT is applied. Table 2 shows the results.

TABLE 2

| Sample | $Al(OH)_3$ Adding quantity (weight percent) | Defect rate (%) |
|---|---|---|
| F | 0.1 | 45 |
| G | 0.5 | 0 |
| H | 1.0 | 0 |
| J | 1.5 | 0 |
| K | 2.5 | 0 |
| L | 3.5 | 0 |
| M | 4.0 | 0 |
| N | 4.5 | 0 |
| P | 5.0 | 38 |

It is apparent from Table 2 that a defect rate is zero in a range when the mixing quantity (adding quantity) of $Al(OH)_3$ is not less than 0.5 weight percent and not greater than 4.5 weight percent (Sample G to Sample N). In Sample F, in which $Al(OH)_3$ is mixed for 0.1 weight percent, Ag is detected across a wide area in the glass ceramic layer. It can be assumed that an effect of hydrated alumina is insufficient due to a small mixing quantity of $Al(OH)_3$. On the other hand, in Sample P, in which $Al(OH)_3$ is mixed for 5 weight percent, some of microscopic regions where Al and Ag coexist are connected. It can be assumed that a defect rate is increased due to occurrence of this phenomenon if $Al(OH)_3$ is mixed too much. Based on the above results, the mixing quantity of $Al(OH)_3$ in ceramic content of the glass ceramic green sheet that forms glass ceramic layer 20 needs to be not less than 0.5 weight percent and not greater than 4.5 weight percent. It is also confirmed, although not apparent in the data, the mixing quantity in mole fraction equivalent also needs to be within this range in the case of using ALOOH.

Next is described confirmation of the effect of hydrated alumina even if an additive other than hydrated alumina is mixed.

A green sheet for the glass ceramic layer is made using powders of borosilicate glass, crystalline silica, $Mg(OH)_2$, and $Al(OH)_3$ mixed in ratio by weight of 68:28:2:2. Using this mixed powder, a laminated ceramic component is manufactured (Sample Q) through the same process as Sample A.

For comparison, a green sheet for the glass ceramic layer is made using powders of borosilicate glass, crystalline silica, and $Mg(OH)_2$ mixed in ratio by weight of 69:29:2. Using this mixed powder, a laminated ceramic component is manufactured (Sample R) through the same process as Sample A. The PCBT test is applied to these samples. Table 3 shows the results.

TABLE 3

| Sample | Additive | Defect rate (%) |
|---|---|---|
| A | $Al(OH)_3$ | 0 |
| Q | $Al(OH)_3 + MG(OH)_2$ | 0 |
| R | $Mg(OH)_2$ | 49 |

Boric acid is liable to deposit on the green sheet during storage when borosilicate glass is used in the green sheet. If a laminated ceramic component uses a green sheet with deposited boric acid, pore is formed on a laminated face, and its reliability deteriorates. To suppress this deposition of boric acid, addition of $Mg(OH)_2$ is particularly effective.

However, Sample R, to which $Mg(OH)_2$ is added but not $Al(OH)_3$, generates defects in the PCBT test. On the other hand, Sample Q, to which both $Mg(OH)_2$ and $Al(OH)_3$ are added, does not generate defects, same as Sample A. Accordingly, the reliability increases by mixing $Al(OH)_3$, also in the case $Mg(OH)_2$ is mixed. As described above, addition of $Mg(OH)_2$ suppresses deposition of boric acid. Accordingly, simultaneous addition of hydrated alumina and $Mg(OH)_2$ has a significant effect in manufacturing a highly-reliable laminated ceramic component.

It is also confirmed that the effect of hydrated alumina is demonstrated even if a small amount of substance other than $MG(OH)_2$, such as $CaCO_3$, is mixed.

The above preferred embodiment refers to a common-mode noise filter as an example of laminated ceramic component. However, the present invention is not limited to this filter. The present invention is also applicable to other laminated ceramic components such as a ceramic filter that includes a circuit generating potential difference in a circuit wiring pattern or laminated ceramic substrate.

Furthermore, the preferred embodiment refers to the structure of sandwiching glass ceramic layer 20 between ferrite magnetic layers 21A and 21B. However, the present invention is not limited to this structure. The present invention is applicable to cases in which the glass ceramic layer and ferrite magnetic layer are attached and sintered.

Industrial Applicability

The laminated ceramic component of the present invention includes the ferrite magnetic layer and the glass ceramic layer that is made chiefly of borosilicate glass and contains an Ag inner conductor. Hydrated alumina is mixed in the glass ceramic green sheet that forms this glass ceramic layer, so that the microscopic region where Al and Ag coexist is dispersed in the glass ceramic layer. As a result, a highly-reliable laminated ceramic component can be manufactured. Accordingly, the present invention offers the laminated ceramic component that supports high frequencies.

| REFERENCE MARKS IN THE DRAWINGS | |
|---|---|
| 10 | Microscopic region where Al and Ag coexist |
| 20 | Glass ceramic layer |
| 20A, 20B, 20C, 20D, 20E | Layer |
| 21A, 21B | Ferrite magnetic layer |
| 22 | Ferrite via |
| 23A, 23B | Flat coil |
| 24A, 24B | Ag via electrode |
| 25A, 25B | Lead wire |
| 26 | External end electrode |
| 231A, 231B, 232B | End |

The invention claimed is:

1. A laminated ceramic component comprising:
a ferrite magnetic layer; and
a glass ceramic layer being laminated with the ferrite magnetic layer, a silver inner conductor being embedded in the glass ceramic layer,
wherein a microscopic region where aluminum and silver particles coexist is dispersed in the glass ceramic layer.

2. A laminated ceramic component comprising:
a ferrite magnetic layer; and
a glass ceramic layer being laminated with the ferrite magnetic layer, a silver inner conductor being embedded in the glass ceramic layer,
wherein a microscopic region where aluminum and silver particles coexist is dispersed in the glass ceramic layer, and
wherein the silver in the microscopic region is other than the silver inner conductor.

3. A laminated ceramic component comprising:
a ferrite magnetic layer; and
a glass ceramic layer being laminated with the ferrite magnetic layer, a silver inner conductor being embedded in the glass ceramic layer,
wherein a microscopic region where aluminum and silver particles coexist is dispersed in the glass ceramic layer, and
wherein the microscopic region is separate from the silver inner conductor.

* * * * *